Figure 1:
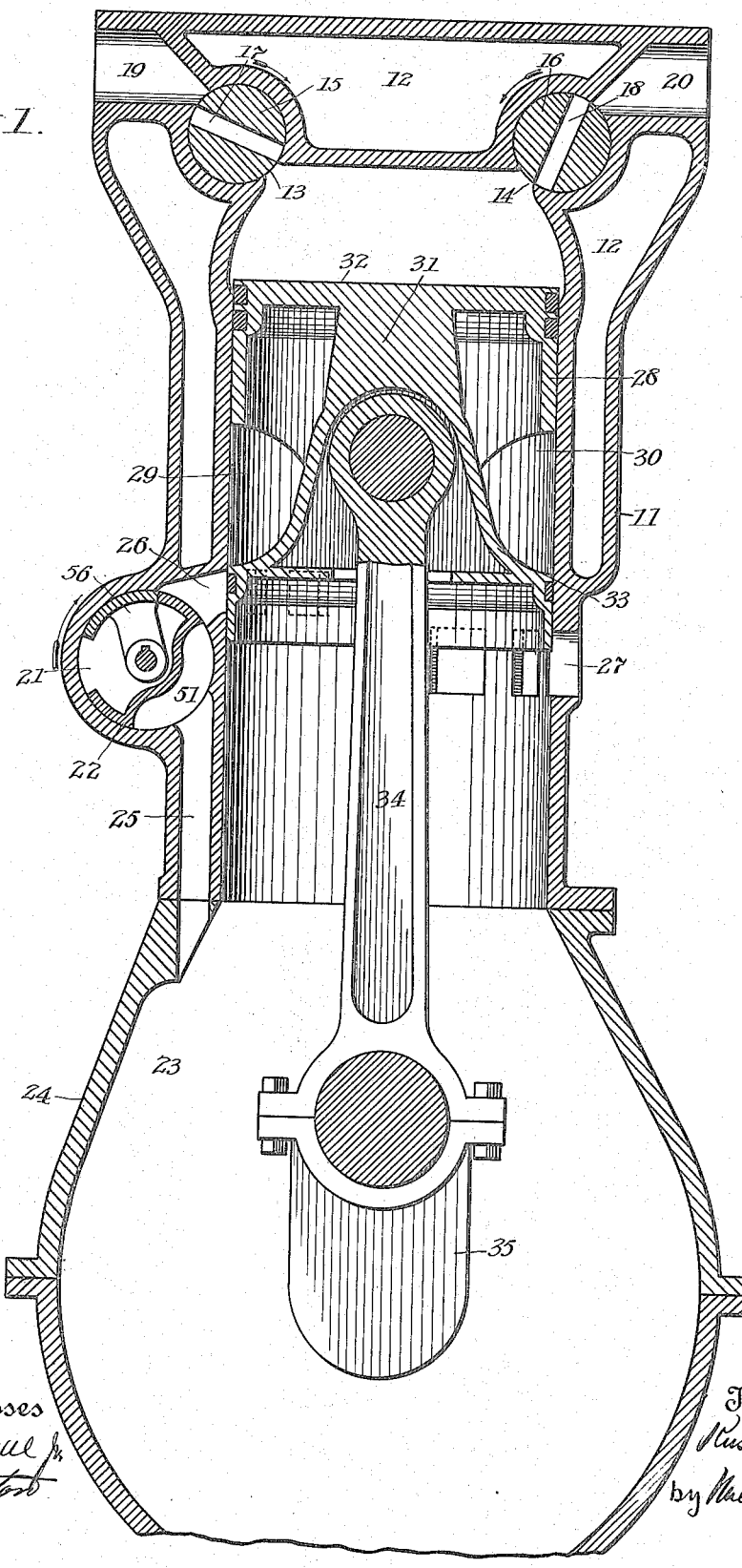

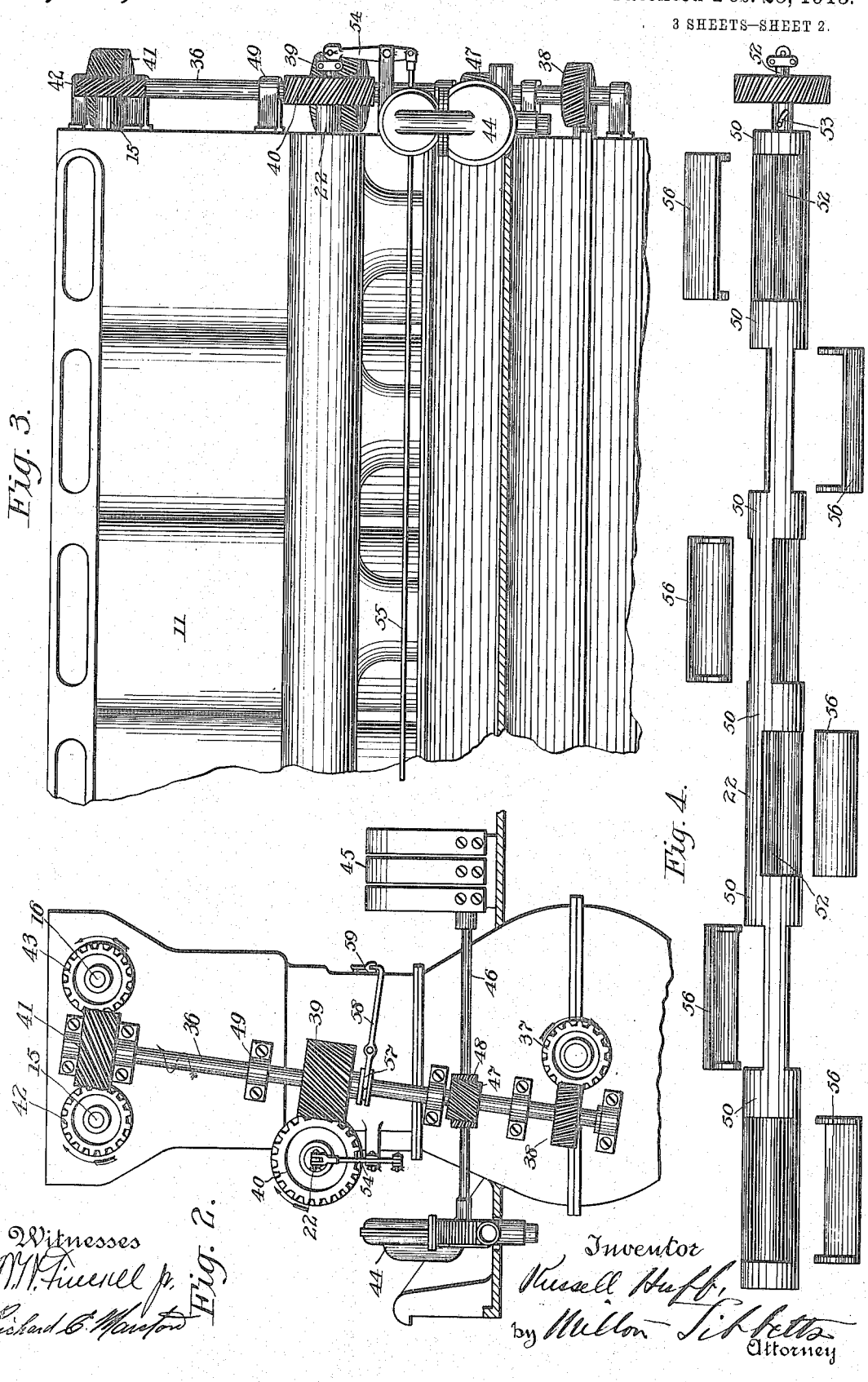

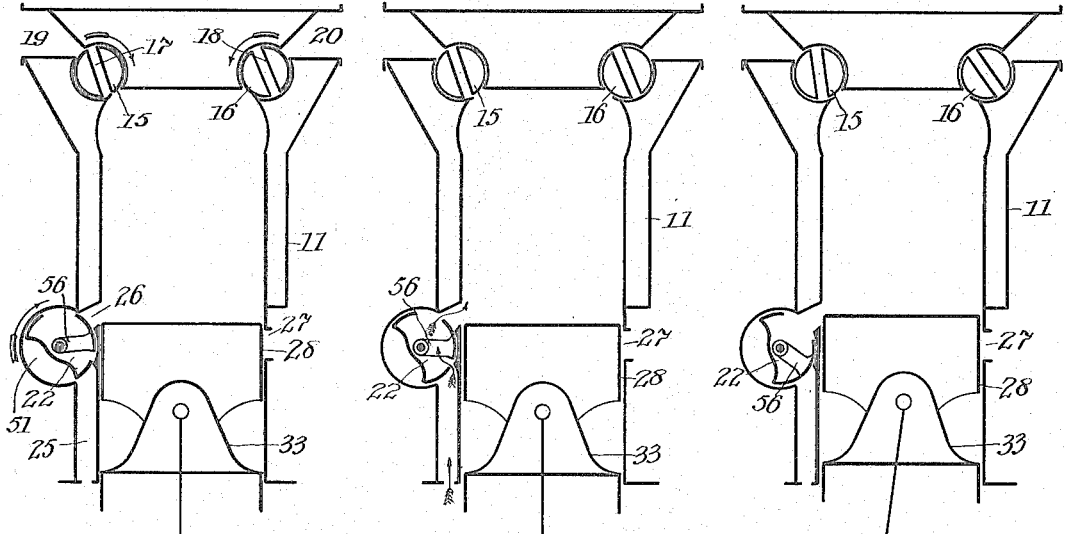
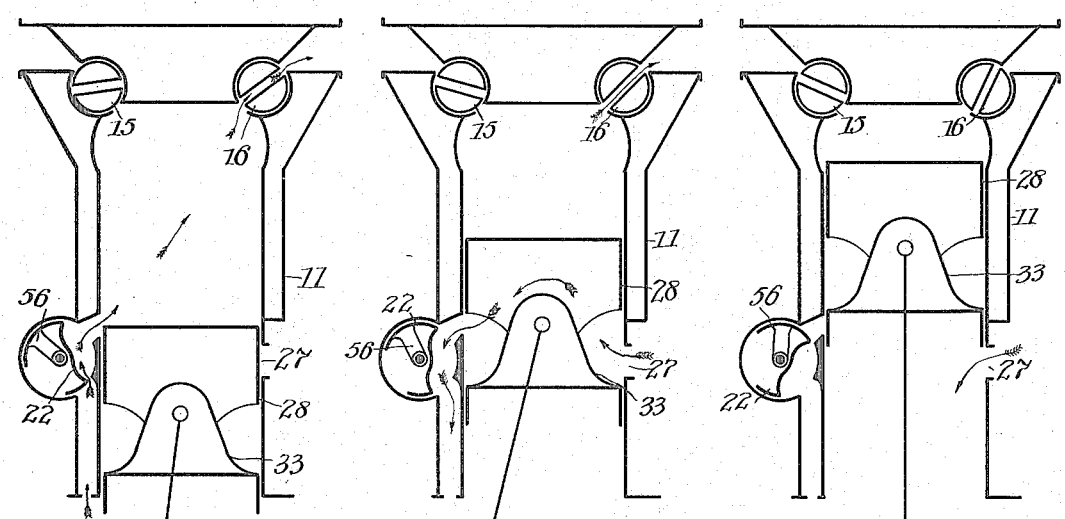

UNITED STATES PATENT OFFICE.

RUSSELL HUFF, OF DETROIT, MICHIGAN, ASSIGNOR TO PACKARD MOTOR CAR COMPANY, OF DETROIT, MICHIGAN, A CORPORATION OF MICHIGAN.

INTERNAL-COMBUSTION MOTOR.

1,129,393.           Specification of Letters Patent.      Patented Feb. 23, 1915.

Application filed May 11, 1911. Serial No. 626,619.

*To all whom it may concern:*

Be it known that I, RUSSELL HUFF, a citizen of the United States, and resident of Detroit, Wayne county, State of Michigan, have invented certain new and useful Improvements in Internal-Combustion Motors, of which the following is a specification.

One of the principal aims of the automobile designer of to-day is to produce a car that is quiet when built and that will stay quiet after continued use, and because of its many moving parts the motor comes in for a large share of the designer's attention along this line. In the efforts to obtain quietness, rotary valves of various forms have been tried but cooling and lubricating difficulties have been encountered with discouraging results.

The present invention relates to internal combustion motors, and particularly to such motors of the four stroke cycle type.

Its principal object is to produce a motor of this type that will operate with extreme quietness while at the same time giving great horse-power in proportion to weight. This object is obtained by a harmonious combination of features, some of which are new in themselves and others of which are old in the art as used alone, whereby the number of reciprocating parts is reduced to a minimum and rotary elements introduced in their stead, whereby large inlet and exhaust port areas are obtained, and whereby the interior of the cylinder is so effectually cooled by the introduction of a blast of cooling air at the end of the firing stroke that a rotary exhaust valve becomes practicable.

Several minor features which go to make up the complete invention will be brought out in the detail description of the invention following.

Being conducive to quietness and permitting of large port areas, a rotary valve has been adopted as giving the best results in the way of controlling the air charges passing into the cylinder; and because of the fact that an internal combustion engine when used on a motor vehicle must be of a very flexible nature, means have been designed by which the alternate action of this valve, hereinafter particularly described, may be regulated.

Other objects of the invention will appear in the following description thereof.

In the drawings, Figure 1 is a vertical transverse section through one of the cylinders of the multi-cylinder motor in which this invention has been illustrated herein; Fig. 2 is a front elevation of this motor; Fig. 3 is a side elevation of approximately the forward half of a 6-cylinder motor embodying the invention; Fig. 4 is a view of the air control valve with its several relatively movable parts removed; and Figs. 5 to 10 inclusive are diagrammatic views illustrating the operation of the motor.

The invention will be described as adapted to a six cylinder motor having main inlet and exhaust ports, and having crank case compression with a separate crank case compartment for each cylinder, with separate valves for controlling the inlet and exhaust ports respectively and a valve for controlling the conduit between each of the crank case compartments and its respective cylinder. As a matter of convenience of illustration and perhaps of manufacture, the six cylinders of the motor are shown as cast in a single block, see particularly Fig. 3, this block casting being represented at 11 with a suitable water jacket 12 along the top and around the sides of the cylinders in the usual way. It will be understood that all of the cylinders are substantially alike in their general construction and, therefore, a description of the cylinder shown in section in Fig. 1 will answer for all.

The main intake port is shown at 13 and the main exhaust port at 14, and these ports are respectively controlled by rotary plug valves 15 and 16 arranged across the tops of the cylinders parallel to each other and to the motor crank shaft. These valves are formed with diametric through ports 17 and 18 respectively, which ports register twice during each rotation of the valves with the ports 13 and 14 and the inlet and exhaust passages 19 and 20 respectively. By this construction of ports and valves it will be seen that the ports, though narrow, may be as long as the diameter or bore of the cylinder, and as the valves open across the ports a quick and comparatively large port opening is obtained. The valves 15 and 16 are arranged to be operated at the ratio of one to four of the crank shaft by a mechanism to be hereinafter described, thus making these valves comparatively slow in operation. A cylindrical valve chamber 21 is formed in one side of the cylinder and a rotary valve 22 is arranged therein to control the passage of air from the compartment 23 in the crank case 24 through the conduit 25 and port 26, which latter is what is known as a "terminal port," being formed in the cylinder wall to be uncovered by the piston at the end of its down stroke. The cylinder is also formed with ports 27 arranged in a plane slightly lower than the ports 26 so that they are uncovered by the piston at the top of its stroke for admitting air directly into the crank case as will appear more fully hereinafter.

The piston 28 is double webbed and is formed with ports 29 and 30 which are adapted to register respectively with the ports 26 and 27 for permitting the passage of air directly through the piston and around the strengthening web 31 for the purpose of cooling the upper web 32 which is subjected to the intense heat of the combustion chamber. The lower web 33 connects the upper and lower parts of the piston. The connecting rod 34 connects the piston with the crank shaft 35 in the usual manner.

It will be understood that suitable inlet and exhaust manifolds may be connected with the passages 19 and 20 respectively and that suitable ignition apparatus and water circulation conduits may be supplied to complete the details of the motor, but as these do not form a part of the invention they are omitted for the sake of clearness.

The three rotary valves hereinabove described are preferably operated by a single shaft which we will term the valve operating shaft 36, and because of the peculiar relative location of the three valves and the crank shaft, this shaft 36 may be arranged with its upper end between the main valves and extend downwardly adjacent the rotary valve 22 and its lower end will be contiguous to the crank shaft and tangentially thereto. In this position of the valve operating shaft it may be driven at a one to one ratio from the crank shaft through a pair of spiral gears 37 and 38, the rotary valve 22 may be driven at a one to two ratio from the operating shaft 36 by spiral gears 39 and 40, and a single spiral gear or worm 41 at the upper end of the operating shaft will drive the main valves at a one to four ratio through the spiral gears 42 and 43 respectively. It will be seen from this that the main valves 15 and 16 are rotated very slowly as compared with the crank shaft, that is at one revolution to four of the crank shaft, whereas the rotary valve 22 is operated twice as fast as the main valves or at one revolution to two of the crank shaft. This latter rotary valve may be operated thus rapidly because of the fact that it is constantly kept cool by the cool air passing over it and it is perfectly lubricated by more or less oil passing up from the crank case with the air. The various relative speeds of these valves are particularly well and simply obtained by the use of the single operating shaft as illustrated and above described. The valve operating shaft 36 is also well adapted to drive the water circulating pump 44 and the magneto 45 by means of a single shaft 46 and the spiral gears 47 and 48. The shaft 36 may be supported in bearings 49, and it will be understood that all of the gears illustrated may be suitably inclosed for protection from dirt and for lubrication.

The rotary valve 22, which may be termed the air valve, is illustrated in detail in Fig. 4 and it will be seen that it consists of a cylinder extending the length of the block casting 11 and provided with several bearings 50 at intervals throughout its length. Between these bearings the wall is cut away to provide circumferential passages 51 of suitable length to connect the conduit or passage 25 with the port 26 while the piston is traveling substantially through one of its strokes and of course for each of the six cylinders this port is at the proper angle to so register with the passage 25 and port 26 during the exhaust stroke of its respective piston. By this arrangement a very large and quick air port opening is obtained for scavenging the cylinder at the end of the firing stroke with air compresed in the crank case. Opposite each of the passages 51 the valve 22 is also cut away throughout a portion of its circumference and a wing 56 is arranged in this cut away portion so as to be rotated relative to the valve proper on the same axis as said valve, and this wing is mounted and keyed for such relative rotation on a rod 52 passing entirely through the center of the valve 22. Thus the wings for all of the cylinders may be rotated simultaneously relative to the valve proper by a relative rotation of the rod 52 which is accomplished through the spiral groove and pin connection 53 of the rod with the valve proper. The rod 52 is shifted longitudinally by the lever 54 and rod 55 which may be manually controlled. As timed for comparatively low speed running the valve 22 opens when the piston is approximately at its lowest point or perhaps 5° beyond, but it is found that at high speeds it is desirable to open this valve somewhat earlier in order to obtain the full scavenging and augmenting effects. This may be accomplished entirely independently of the means for controlling the angularity of the wings 56, by shifting the spiral gear 39 longitudinally of the shaft 36. The gear 39 may be keyed to the shaft 36 and reciprocated by a yoke 57 of the lever 58 and rod 59 which may be manually controlled.

A full cycle of operation of the motor may be described as follows: As shown in Fig. 1 the piston is at the top of its stroke having just forced out the burnt gases through the exhaust port 18 in the valve 16, which valve has just closed the port 14. The inlet port 13 is now being opened by the inlet valve 15 and during the entire down stroke of the piston the port 17 will be open and the combustion charge taken into the cylinder. It will be seen also that the ports 27 are uncovered by the bottom of the piston and the crank case is open to the atmosphere whereby the compartment 23 is filled with air at approximately atmospheric pressure. It is proper to add, however, that all of the air in the crank case has not been admitted through the ports 27 but has been taken in through the piston, as will be hereinafter described. During the aforementioned down stroke of the piston the air in the crank case was prevented from passing out through the port 26 and the piston. As the piston reaches the end of its down stroke the port 26 is fully uncovered, and presuming that the wing 56 is partly open as shown in diagrammatic Fig. 5, the valve 22 will permit the passage of the air from the crank case around the wing 56 and through the port 26 into the cylinder for the purpose of augmenting the charge therein. The cylinder will then have a charge somewhat greater than atmospheric pressure and as the piston ascends it cuts off the port 26 from the combustion space of the cylinder and the charge therein is compressed. When the piston is about half way up on this stroke, it uncovers both the port 26 and the port 27 and as the valve 22 still maintains communication between the conduit 25 and the port 26, and as the piston on its upward stroke is creating a partial vacuum in the crank case compartment 23, air enters through port 27, the interior of the piston 28, port 26, valve 22 and conduit 25 into the crank case compartment 23. This continues until the lower part of the piston cuts off communication through the piston between ports 26 and 27 and opens the port 27 directly to the crank case, after which time in the travel of the piston air enters the crank case directly through the port 27 until the piston reaches the upper end of its stroke. After communication has been cut off through the piston between ports 26 and 27 on this up stroke of the piston the valve 22 closes communication between the conduit 25 and port 26 and this communication remains closed as the piston descends. The charge having been compressed by the up stroke of the piston, it is fired and drives the piston downwardly on what is termed the firing stroke and it will be understood that the air taken into the crank case as previously described will be compressed therein and as the piston reaches the bottom of its stroke the passage 51 of the valve 22 opens communication between the conduit 25 and the port 26 and permits the compressed air in the crank case to rush into the cylinder and scavenge the latter, driving out the burnt gases through the exhaust port 18 which has been opened to the cylinder as the piston approaches the end of its firing stroke. The scavenging air and what remains of the gases are expelled through the exhaust port 14 during the succeeding up stroke of the piston and air is again drawn into the crank case through the piston as on the compression stroke, the passage 51 maintaining communication between the conduit 25 and the port 26 during its entire up stroke. This completes the four strokes of the cycle.

The operation will perhaps be more clearly understood upon reference to diagrammatic Figs. 5 to 10 inclusive.

In Fig. 5 the piston is at the bottom of the intake stroke and the wing 56 is so positioned that augmenting of the main charge is about to take place, the main intake port having just closed and the exhaust port of course being fully closed.

In Fig. 6 the air valve has been advanced relative to the position of the piston by moving the gear 39 as above described and it will be seen that although the piston is in exactly the same position as it is in Fig. 5 yet the air valve has opened considerably and the charge of air in the crank case is being forced into the cylinder for augmenting the combustion charge.

In Fig. 7 the wing 56 is shown in closed position so that although the piston has moved upwardly to the position where the air valve would ordinarily be wide open for augmenting, yet, because of the fact that the wing 56 is in closed position, augmenting does not take place and the compressed air in the crank case is retained therein. It will be understood that this cutting off of the augmenting is for the purpose of reducing the motor power or speed.

In Fig. 8 the piston has just started on the exhaust stroke and of course the exhaust valve is practically wide open and the air valve 22, by means of the passage 51, is permitting the crank case air to scavenge the cylinder, blowing the burnt gases out through the exhaust port. It will, of course, be seen that some of the air from the crank case will be also blown out through the exhaust port, thus considerably cooling the latter. It will also be noted in this connection that the cylinder is scavenged at the end of every firing stroke regardless of the position of the wing 56 which is adapted to control only the admission of air for augmenting. Thus the exhaust valve is cooled as above set forth at every half revolution thereof.

In Fig. 9 the piston has moved about half way up on the exhaust stroke and the air valve 22 is wide open admitting air to the crank case through the passage 25, the port 26, the port 27, and directly through the piston, thus cooling the latter, as set forth hereinabove.

In Fig. 10 the piston is at the top of the exhaust stroke, the port 26 is covered by the lower part of the piston, the air valve 22 is just closed, and air is being admitted directly into the crank case through the port 27. Thus it will be seen that ample opportunity is provided by means of the port 27 for the crank case to be filled with air for scavenging the cylinder and cooling the exhaust valve regardless of the position of the wing 56.

Having thus described my invention, what I claim is:

1. In a hydrocarbon motor, the combination with the cylinder having main intake and exhaust ports and an auxiliary port, and a rotary valve for each of said ports, of a single valve operating shaft actuated by the motor crank shaft, and direct drive connections between said valve shaft and each of said valves for operating all of said valves.

2. In a hydrocarbon motor, the combination with the cylinder having main intake and exhaust ports and an auxiliary port, and a rotary valve for each of said ports, of means, actuated by the motor crank shaft, for operating the main valves at a reduced speed relative to the crank shaft and for operating the auxiliary valve faster than the main valves.

3. In a hydrocarbon motor, the combination with the cylinder having main intake and exhaust ports and an auxiliary port, and a rotary valve for each of said ports, of means, actuated by the motor crank shaft, for operating the main valves one revolution to four of the crank shaft and for operating the auxiliary valve one revolution to two of the crank shaft.

4. In a hydrocarbon motor, the combination with the main valves, a rotary auxiliary valve, and the crank shaft having a gear thereon, of means for operating said valves comprising gears on said valves, a valve operating shaft having a gear meshing with said gear on the crank shaft and having gears meshing with the gears on said valves, one of said gears on said valve operating shaft being adapted for shifting longitudinally of said shaft for varying the timing of the valve driven by the said gear.

5. In a hydrocarbon motor, the combination with the cylinder having main intake and exhaust ports and an auxiliary port, a crank shaft having a gear thereon, a piston, and a connecting rod, of a rotary valve for each of said ports, a gear for each of said valves, a valve operating shaft, and gears on said latter shaft in mesh with the gear on the crank shaft and with the gears on said valves.

6. In a hydrocarbon motor, the combination with the cylinder having a port at its explosion end and a port traversed by the piston, of a rotary valve for each of said ports, a gear on the motor crank shaft, a gear on each of said rotary valves, a valve operating shaft, and gears on said valve operating shaft in mesh with the gear on the crank shaft and with the gears on said valves.

7. In a hydrocarbon motor, the combination with the main valves and a rotary auxiliary valve, of means for operating all of said valves, and means for advancing the timing of said rotary valve without affecting the timing of said main valves.

8. In a hydrocarbon motor, the combination with the main valves and a rotary auxiliary valve, of means for operating said valves including a valve operating shaft, and gears connecting said shaft with the crank shaft and with said rotary valve, and means on said valve operating shaft for varying the timing of said rotary valve.

9. In a four stroke cycle hydrocarbon motor having a crank case, the combination with the cylinder having a port traversed by the piston, of a rotary valve adapted to control said port and arranged to place it in communication with the motor crank case approximately at the end of the firing stroke of the piston for scavenging the cylinder, said rotary valve having a relatively movable part adapted to be operated to cause said valve to place said port in communication with the crank case approximately at the end of the intake stroke for augmenting the charge, and means for moving said relatively movable part while the motor is running.

10. In a four stroke cycle hydrocarbon motor having a crank case, the combination with the cylinder having a port traversed by the piston, of a rotary valve adapted to control said port and arranged to place it in communication with the motor crank case approximately at the end of the firing stroke of the piston for scavenging the cylinder, said rotary valve having a relatively movable part adapted to be operated to cause said valve to place said port in communication with the crank case approximately at the end of the intake stroke for augmenting the charge, means for moving said relatively movable part while the motor is running, and means for varying the timing of said valve relative to the crank shaft.

11. In a multi-cylinder hydrocarbon motor of the four cycle type, the combination with the main intake and exhaust valves and means for operating them, of means for compressing air in the separate compartments under each cylinder, means comprising a conduit leading from each crank case compartment to its respective cylinder, a rotary valve controlling the passage of air through said conduits, said valve having a cut away portion for each cylinder to permit the passage of air at the end of the firing stroke of each piston in proper sequence, said valve also comprising a relatively rocking part to regulate the passage of air at the end of the intake stroke of each piston in proper sequence, and means for driving said valve from the crank shaft at a ratio of one to two thereof.

12. In a four stroke cycle hydrocarbon motor having a crank case, the combination with the cylinder having a port traversed by the piston, of a rotary valve adapted to control said port and arranged to place it in communication with the motor crank case approximately at the end of the firing stroke of the piston for scavenging the cylinder, said rotary valve having wings adapted to rock about the axis of the valve and to form ports between the wings and the walls of the valve to cause said valve to place said port in communication with the crank case approximately at the end of the intake stroke for augmenting the charge, and means for rocking said wings relatively to the valve while the motor is running.

13. In a four stroke cycle hydrocarbon motor having a crank case, the combination with the cylinder having a port traversed by the piston, of a rotary valve adapted to control said port and arranged to place it in communication with the motor crank case approximately at the end of the firing stroke of the piston for scavenging the cylinder, said rotary valve having wings adapted to rock about the axis of the valve and to form ports between the wings and the walls of the valve to cause said valve to place said port in communication with the crank case approximately at the end of the intake stroke for augmenting the charge, and means for rocking said wings relatively to the valve while the motor is running, said means comprising a shaft extending longitudinally through the valve and adapted to slide longitudinally thereof, and a pin and angular slot connection between said valve and shaft for effecting an angular adjustment of the shaft relative to the valve as the former is moved longitudinally thereof.

14. In a multi-cylinder hydrocarbon motor of the four cycle type, the combination with the main intake and exhaust valves and means for operating them, of means for compressing air in the separate compartments under each cylinder, means comprising a conduit leading from each crank case compartment to its respective cylinder, a rotary valve controlling the passage of air through said conduits, said valve having a cut away portion for each cylinder to permit the passage of air at the end of the firing stroke of each piston in proper sequence, said valve also comprising a relatively rocking part to regulate the passage of air at the end of the intake stroke of each piston in proper sequence, a shaft passing longitudinally through the valve and connected to said relatively rocking part, and means for moving said shaft longitudinally of the valve for effecting the rocking movement of said part, and means for driving said valve from the crank shaft at a ratio of 1 to 2 thereof.

In testimony whereof I affix my signature in the presence of two witnesses.

RUSSELL HUFF.

Witnesses:
W. H. FINCKEL, Jr.,
RICHARD E. MARSTON.